United States Patent [19]

Wakatsuki

[11] 4,060,324

[45] Nov. 29, 1977

[54] LENS SWITCHING MECHANISM FOR USE IN COPYING MACHINE

[75] Inventor: Susumu Wakatsuki, Ebina, Japan

[73] Assignee: Rank Xerox Ltd., London, England

[21] Appl. No.: 709,033

[22] Filed: July 27, 1976

[30] Foreign Application Priority Data

Nov. 21, 1975 Japan ........................... 50-157371[U]

[51] Int. Cl.[2] ........................................ G03B 27/70

[52] U.S. Cl. ................................................ 355/60

[58] Field of Search ..................... 355/55, 57, 60, 63; 350/38, 39, 254

[56] References Cited

U.S. PATENT DOCUMENTS

| | | | |
|---|---|---|---|
| 3,476,478 | 11/1969 | Rees | 355/55 |
| 3,542,467 | 11/1970 | Ferguson et al. | 355/60 X |
| 3,733,128 | 5/1973 | Naumann et al. | 355/57 X |
| 3,779,642 | 12/1973 | Ogawa et al. | 355/55 |
| 3,843,254 | 10/1974 | Pramstraller et al. | 350/39 X |
| 3,936,150 | 2/1976 | Ikeda | 355/60 X |

FOREIGN PATENT DOCUMENTS

| | | | |
|---|---|---|---|
| 1,337,053 | 11/1973 | United Kingdom | 355/63 |

*Primary Examiner*—Donald A. Griffin

[57] ABSTRACT

A copying machine includes a system for projecting an image of an original onto a photosensitive member selectively at one of a plurality of magnifications. The projection system includes two lenses. A movable carriage supports the lenses. The carriage is arranged for movement between a first position wherein one of the lenses is operative and a second position wherein the other of the lenses is operative. Adjustable stops are provided for stopping the carriage at the first or second positions. An overcenter device responsive to the movement of the carriage more than half its distance of travel between the first and second positions operates to move and bias the carriage against the stops.

3 Claims, 9 Drawing Figures

FIG. 4
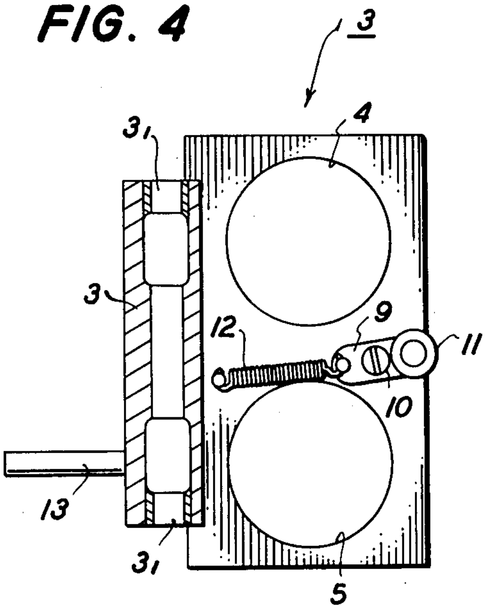
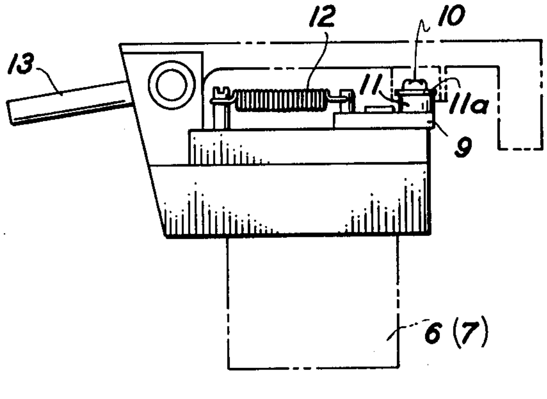
FIG. 5
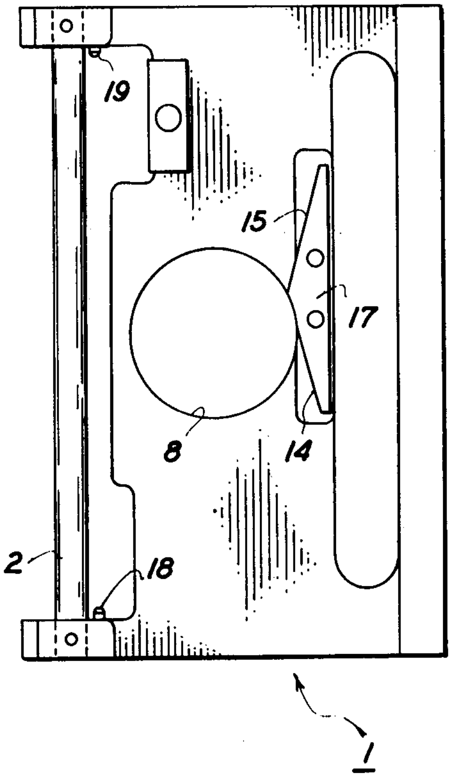
FIG. 6

LENS SWITCHING MECHANISM FOR USE IN COPYING MACHINE

BACKGROUND OF THE INVENTION

The present invention relates to a lens switching mechanism for use in a copying machine, and more particularly to a mechanism employed for switching lenses so as to change the magnifying power of the machine for duplication.

SUMMARY OF THE INVENTION

In accordance with the present invention a copying machine is provided which includes means for projecting an image of an original onto a photosensitive member selectively at one of a plurality of magnifications. The projecting means includes two lenses. A movable carriage supports the lenses. The carriage is arranged for movement between a first position wherein one of the lenses is operative and a second position wherein the other of the lenses is operative. Adjustable means are provided for stopping the carriage at the first or second positions. Over center means responsive to the movement of the carriage more than half its distance of travel between the first and second positions is provided to move and bias the carriage against the stops.

In accordance with a preferred embodiment the means for supporting the carriage includes an angular guide member having inclined guide surfaces meeting at an apex. A roller is supported on an arm which in turn is pivotally supported by the carriage. The arm is spring biased to urge the roller against the angular guide surfaces of the guide member. Upon movement of the carriage so that the roller passes the apex of the guide surfaces the carriage automatically is moved and biased against the respective stop.

Accordingly, it is an object of the present invention to provide a lens switching mechanism for a copying machine wherein there occurs no deviation with respect to the optical centering of the lenses as they are switched and wherein less precision is required in manufacture.

These and other objects will become more apparent from the following description and drawings.

BRIEF DESCRIPTION OF THE DRAWINGS

FIG. 4 is a rear view of the lens carriage of the apparatus of FIG. 3.

FIG. 5 is a side view of the lens carriage of the apparatus of FIG. 3.

FIG. 6 is a front view of the lens carriage support of the apparatus of FIG. 3.

DETAILED DESCRIPTION OF THE PREFERRED EMBODIMENTS

The present invention relates to a lens switching mechanism for use in a copying machine, and more particularly to a mechanism employed for switching lenses so as to change the magnifying power for duplication in a copying machine.

Figure 1:
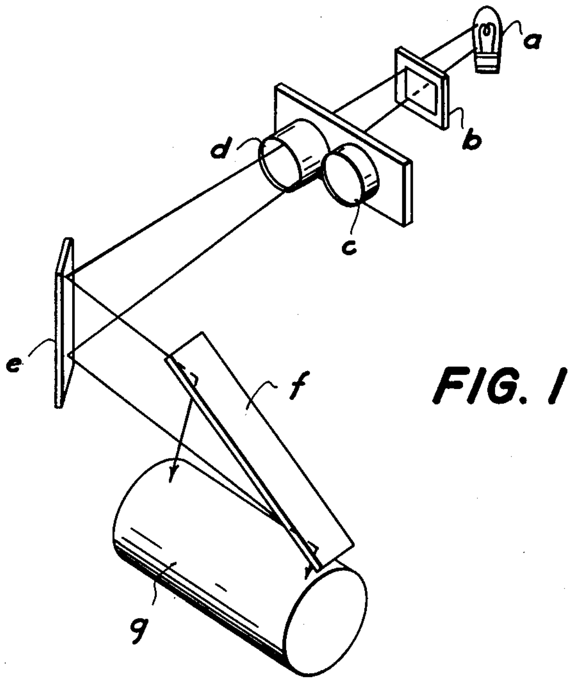
FIG. 1 is a schematic view of a microfilm copying machine.

A typical copying machine capable of changing its magnifying power for duplication is an electrophotographic microfilm duplicator whose general construction is illustrated in FIG. 1. A microfilm is supported in a microfilm holder *b* and is irradiated by a light source *a*. The original image on the microfilm is enlarged through a lens *d* held in a lens holder *c* and then is projected through reflex mirrors *e, f* to expose a photosensitive member *g* so that an electrostatic latent image is formed on the photosensitive member *g*. After development with a developer, the latent image is transferred to a sheet of paper and then fixed to produce an enlarged copy.

Figure 2:
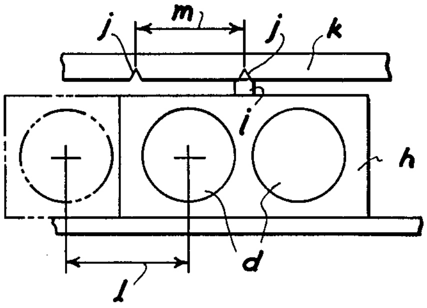
FIG. 2 illustrates a lens switching mechanism employed in a conventional copying machine.

The lens holder *c* is equipped with two lenses *d* which have different magnifications (normally about 10 to 15). The lenses are manually switchable as desired. This switching mechanism has a structure, as shown in FIG. 2. A plunger *i* is connected to a movable part *h* mounting the lenses *d* thereon. Each lens is positioned by insertion of the plunger *i* into a groove *j* formed on a guide rail *k*.

When switching the lenses in the above mechanism, however, unless the manual switching lever of the movable part *h* is released after there has been positive insertion of the plunger *i* into the groove *j*, proper switchover of the lenses is not attained thereby causing failure in duplication. There exists another disadvantage in that the lens switching stroke *e* is determined by the distance *m* between the grooves *j*, and therefore, it is necessary to set the distance *m* with great accuracy for optically centering the two lenses when operative. This requires a high precision in manufacture which is expensive.

The present invention solves the above-mentioned problems.

An exemplary embodiment of the present invention will be described with reference to FIGS. 3 through 9. The upper part of a support base 1 is equipped with a slide shaft 2 inserted into a hole $3_1$ formed in a lens holder or carriage 3. The lens holder 3 is disposed slidably on the suupport base 1. The lens holder 3 has a pair of openings 4, 5 where lenses 6, 7 providing different magnifications are mounted respectively. By sliding the lens holder 3 to either side of the support base 1, either of the lenses 6, 7 can be moved into alignment with an opening 8 formed in the center of support base 1.

Figure 3:
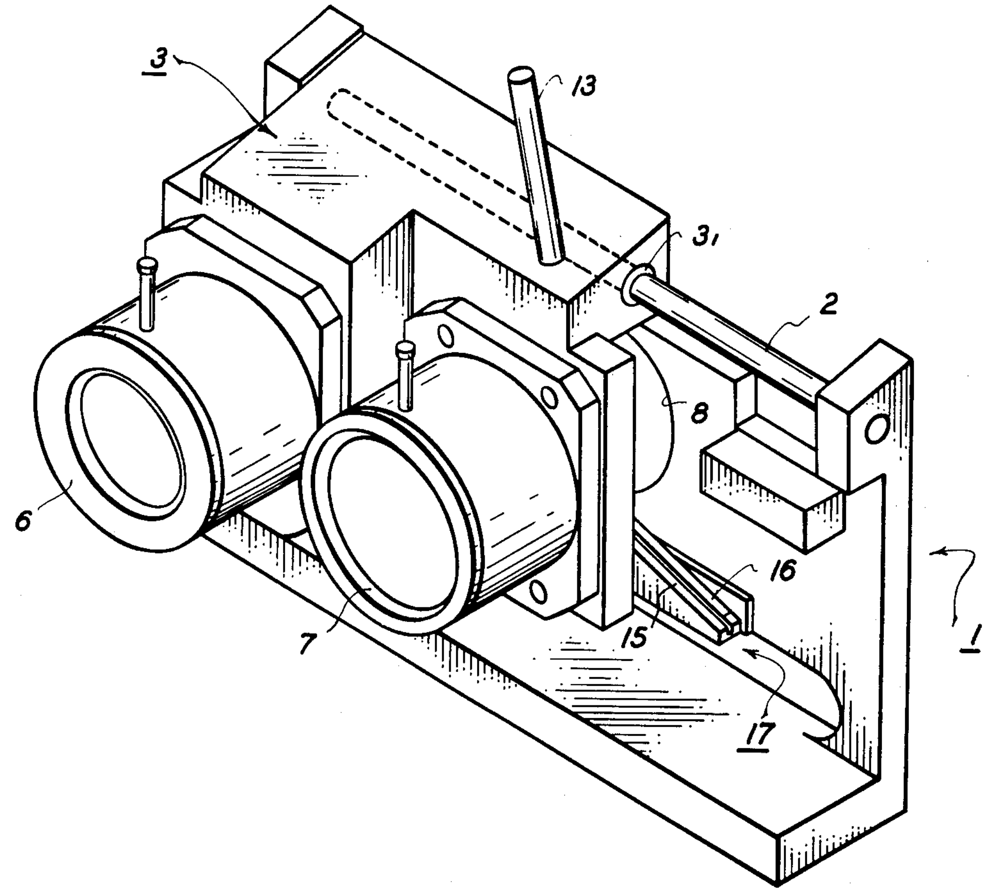
FIG. 3 is a perspective view of a lens switching mechanism in accordance with the present invention.

Below the substantial center of the lens holder surface opposed to the support base 1, an intermediate portion of an arm 9 is pivoted rotatably by a screw 10 as shown in FIGS. 4 and 5. A roller 11 having a flange 11*a* is connected rotatably to one end of the arm 9. One end of a spring 12 is connected to the other end of arm 9. The other end of spring 12 is anchored to lens holder 3 so as to bias the arm 9. The upper part of lens holder 3 is equipped with a manual switching lever 13 which may be grasped by hand for shifting the lens holder 3 between respective lens positions. As shown in FIG. 6, an angular guide member 17 having inclined surfaces 14, 15 on the top thereof is provided below the substantial center of the support base surface opposed to the lens holder 3. A groove 16 is formed on the inclined surfaces 14, 15 as illustrated in FIG. 3, so that when the flange 11*a* of roller 11 is fitted in the groove 16, the roller 11 moves along the inclined surfaces 14, 15.

Stoppers 18, 19, whose protrusions are screw adjustable, are disposed in the vicinity of left and right mounting portions of slide shaft 2 of support base 1, as shown in FIG. 6. When the lens holder 3 slides leftward or rightward, its left or right end butt up against the stoppers 18, 19 respectively to determine the left and right stop positions of the holder and lenses 6, 7.

Figure 7:
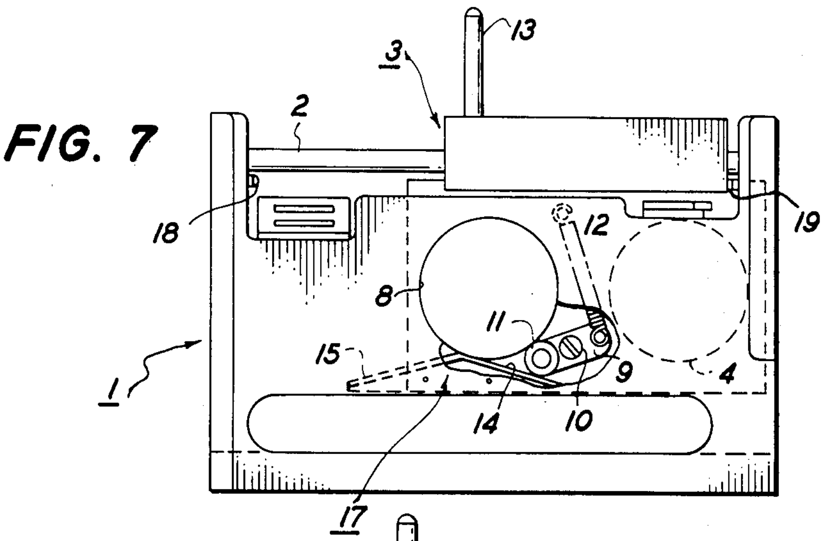
FIG. 7 is a rear view of the apparatus of FIG. 3 at a first position in its operation.

A description will now be given of the operation of the apparatus of this invention with reference to FIGS. 7 through 9. FIG. 7 shows the lens holder 3 as moved to the extreme right. The roller 11 of arm 9 is urged by spring 12 to be biased against the inclined surface 14 of guide member 17. The entire lens holder 3 is biased to the right due to the reaction force from the inclined surface 14.

Figure 8:
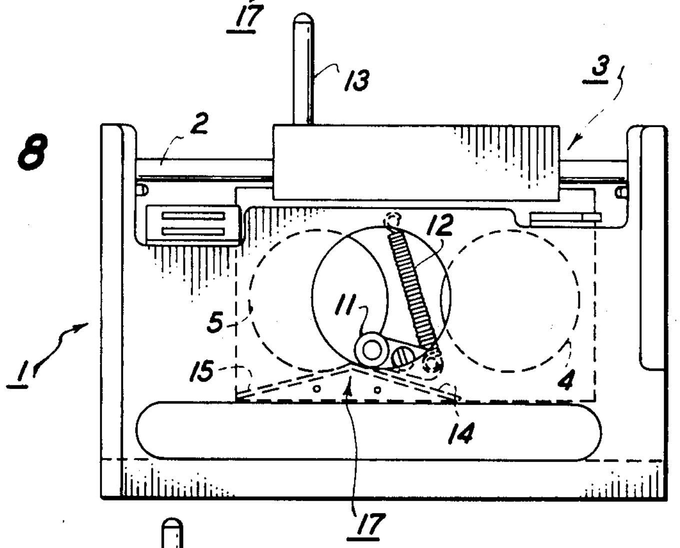
FIG. 8 is a rear view of the apparatus of FIG. 3 at an intermediate position in its operation.
Figure 9:
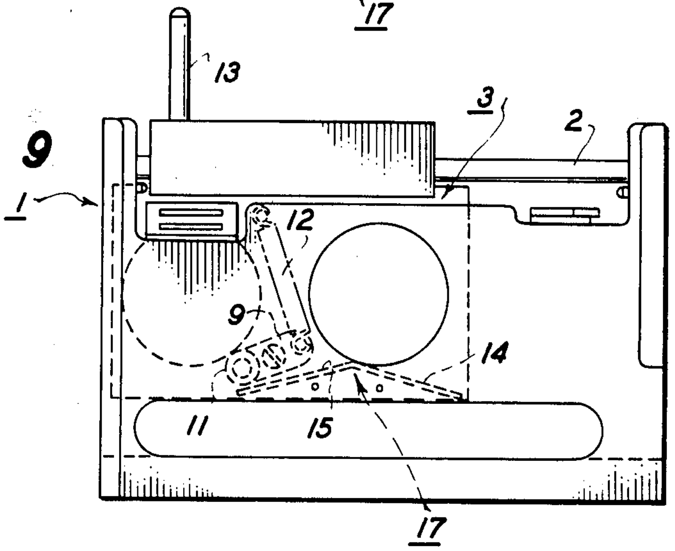
FIG. 9 is a rear view of the apparatus of FIG. 3 at a second position in its operation.

When the lens holder 3 is moved leftward manually by the switching lever 13, the roller 11 ascends the inclined surface 14 as shown in FIG. 8 and passes over the apex or joint between the inclined surfaces 14, 15 of guide member 17. After the roller 11 passes over the apex of guide member 17, it is urged by spring 12 to be biased against the inclined surface 15 without any operation of the switching lever 13. The reaction force due to the inclined surface 15 causes the entire lens holder 3 to move to the left, thereby completing switchover of the lenses.

As will be understood clearly from the above description, according to the present invention, the lens holder 3 is shifted automatically when released, if it has moved until the roller 11, passes over the apex of angular guide member 17 or just over half its distance of travel. Consequently, presetting the stop positions of lens holder 3 eliminates occurrence of deviation with respect to the optical center of lenses 6, 7. Furthermore, there is no necessity of forming a conventional groove which requires a high accuracy in manufacture, thereby offering a remarkable convenience in manufacturing the device.

What is claimed is:

1. In a copying apparatus including means for projecting an image of an original onto a photosensitive member selectively at one of a plurality of magnifications, said projecting means including:

two lenses;

a movable carriage for supporting said lenses;

means for supporting said carriage for movement between a first position wherein one of said lenses is operative and a second position wherein the other of said lenses is operative;

the improvement wherein, said apparatus further includes:

adjustable means for stopping said carriage at said first or second positions; and over center means responsive to the movement of said carriage more than half its distance of travel between said first and second positions for moving and biasing said carriage against said stop means, said over center means comprising:

a guide member having inclined surfaces meeting at an apex, said guide member being supported by said carriage support means; an arm pivotably supported by said carriage; a roller supported at one end of said arm; and a spring biasing said arm about said pivot, said spring being connected to the other end of said arm, said arm and roller being arranged so that said roller is biased against said inclined surfaces, said apex of said inclined surfaces being positioned about halfway along a path of travel of said roller between said first and second positions.

2. An apparatus as in claim 1, wherein said roller includes a flange and wherein said guide member includes a groove for cooperatively receiving said flange.

3. An apparatus as in claim 2, wherein said adjustable stop means are screw adjustable.

* * * * *